Aug. 21, 1962   D. E. VOTH   3,049,898
APPARATUS FOR TRANSMITTING ROTARY MOTION
Filed March 15, 1961
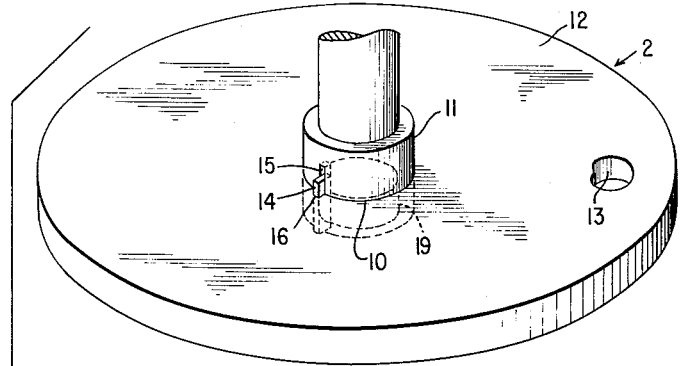
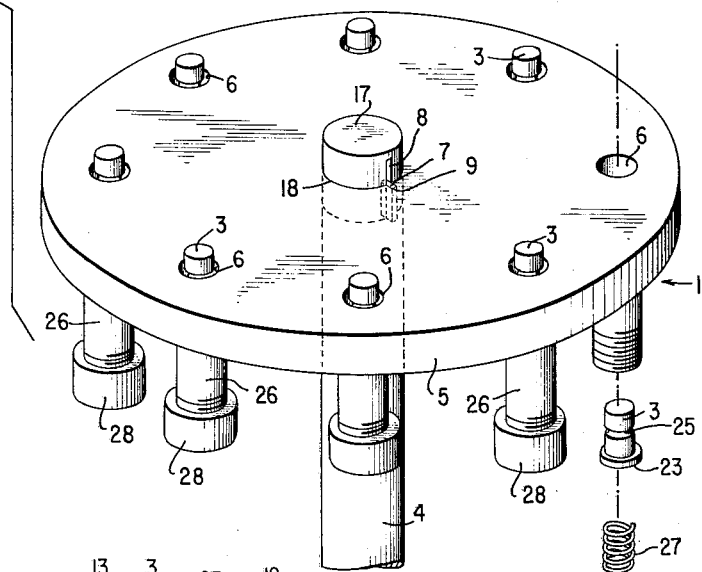
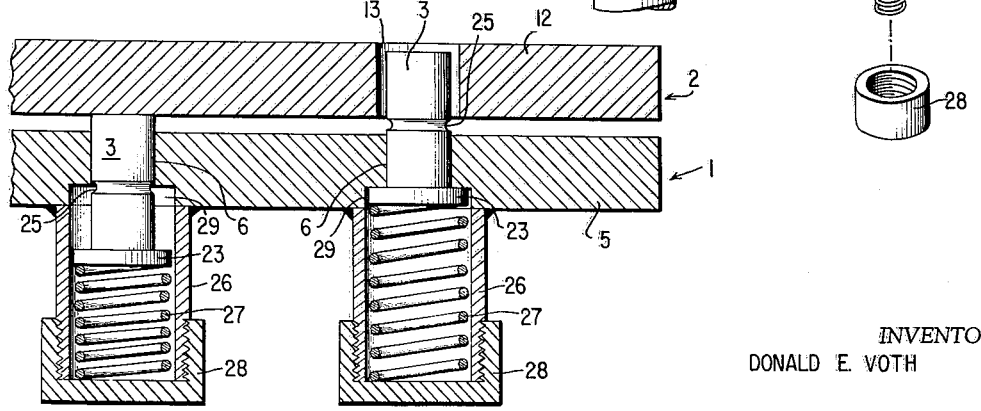
INVENTOR
DONALD E. VOTH
BY Shanley & O'Neil
ATTORNEYS

United States Patent Office 3,049,898
Patented Aug. 21, 1962

3,049,898
APPARATUS FOR TRANSMITTING
ROTARY MOTION
Donald E. Voth, Baton Rouge, La., assignor to Copolymer Rubber & Chemical Corporation, a corporation of Louisiana
Filed Mar. 15, 1961, Ser. No. 95,847
7 Claims. (Cl. 64—28)

This invention relates to apparatus for transmitting motion. More particularly, this invention relates to coupling devices for moving machinery members and particularly to an improvement in shear pin connecting devices for protecting moving or rotating members from excessive loads.

In the operation of machinery having rotating parts, the machine may occasionally become overloaded. For example, foreign objects may fall into and jam the mechanism. Also, in some instances, the machine may be called upon to perform a task beyond its strength. For example, in a crushing apparatus a piece of material which is too hard or strong for the device to handle may be accidentally fed to the machine. In any event when such mechanisms become overloaded, breakage will generally occur in the weakest member.

In order to avoid breakage of expensive elements or components of the apparatus, it has been the practice in the prior art to provide means for automatically breaking the driving connection between coupled shaft sections or other coupled parts when the load becomes excessive. A common device of this type is known as a shear pin. Such pins are adapted to connect two elements or members, for example shafts, thus locating the break at a predetermined point and preventing the breaking of other parts of the machine. The shear pin after being broken is removed and replaced with another pin.

Such prior art practice possesses certain inherent disadvantages with regard to lost time and labor expense involved in removing the broken shear pin and replacing it with a new one. Often, the stoppage of one machine will result in stopping a whole series of operations in a production process and thus the loss of time due to shearing of a pin can be very expensive.

Accordingly, it is the purpose of this invention to provide an apparatus for transmitting rotary motion through a shear pin wherein a broken shear pin is automatically replaced without the necessity of stopping the apparatus and without loss of time.

This invention will be described more particularly with reference to the accompanying drawings, wherein like numerals represent like parts of the various views. In the drawings:

FIGURE 1 is an exploded perspective view of a coupling device embodying the principles of this invention; and FIGURE 2 is a fragmentary sectional view of the assembled coupling device of FIGURE 1.

With reference to the drawings, the apparatus for transmitting rotary motion, embodying of the principles of this invention, comprises a first or driving member generally indicated at 1, a second or driven member generally indicated at 2, a plurality of shear pins 3 one of which connects the driving member 1 with the driven member 2 and automatic means for replacing a broken shear pin 3 with another shear pin 3.

More specifically, the driving member 1 comprises a shaft 4 connected to a prime mover, a gear box or one section of a machine and a flange 5 having a plurality of openings 6 therein the defining walls of which openings may be the structure of flange 5. Flange 5 is affixed to the shaft 4 by suitable means. For example, shaft 4 may be disposed within an opening 18 of substantially the same diameter provided in flange 5 and keyed to flange 5 by means of a key member 7 and slots 8 and 9 provided in shaft 4 and flange 5 respectively.

The driven member 2 comprises a shaft 11 and a flange 12 having an opening 13 provided therein. Flange 12 is affixed to shaft 11 by suitable means. For example, shaft 11 may be disposed within an opening 10 of substantially the same diameter provided in flange 12 and keyed to flange 12 with a key member 14 and slots 15 and 16 provided in shaft 11 and flange 12 respectively.

The shaft 11 is axially aligned with the shaft 4 by suitable means such, for example, as an extension 17 of shaft 4 and a matching recess 19 provided in shaft 11. The extension 17 is disposed within recess 19 when flanges 5 and 12 are operatively connected. Shaft 11 is then suitably connected by gears, etc. to the balance of the apparatus. In a typical installation of a device of this type, the shaft 4 will be connected to a prime mover or to a gear box which is in turn connected to a prime mover while the shaft 11 will be connected to a machine. While shaft 4 is described herein as a driving shaft and shaft 11 as a driven shaft it is within the scope of this invention to employ shaft 11 as the driving shaft and shaft 4 as the driven shaft.

One of the shear pins 3 is disposed within an opening 6 of flange 5 and opening 13 of flange 12 for transmitting rotary motion from the flange 5 to the flange 12. The shear pin 3 has a flange 23 provided at the end opposite the end disposed within the opening 13 in the flange 12. The diameter of the openings 6 in the flange 5 is slightly larger than the diameter of the shear pins 3. In order to effectively transmit the rotation of flange 5 to flange 12 it is necessary for the pin 3 to be longer than the thickness of the flange 5. However, it is preferred that the pin does not extend all the way through the opening 13 in flange 12 and accordingly, the length of the shear pin 3 should be less than the sum of the thicknesses of the driving flange 5 and the driven flange 12.

A circumferential groove 25 is provided around the shear pins 3 in a position to be located at the plane of division between flanges 5 and 12 when the shear pin 3 is in position within the openings 6 in the flange 5 and the opening 13 in the flange 12. By provision of the circumferential groove 25 a weakened zone is provided in the pin 3 which is located at the plane between the flanges. This is the weakest point in the pin and the pin is the weakest point in the apparatus and thus an overload will cause the pin to shear at the groove 25. If the pin did not shear at the plane between the flanges 5 and 12, a portion of the pin may still connect flanges 5 and 12 together after breaking and thus there would be no rotation of flange 5 relative to flange 12 and accordingly, damage to other parts of the apparatus would result, and the purpose of the shear pin would not be achieved. In addition, the automatic replacement feature of this invention to be described below would not be effective.

The balance of the shear pins 3 which are identical with the shear pin 3 disposed within the opening 13 of flange 12 is provided with their ends in openings 6 and means are provided for urging the shear pins 3 toward the flange 12. This means comprises tube members 26 affixed to the flange 5, by suitable means such as welding, coaxially with respect to the openings 6 of flange 5. The tube members 26 have inside diameters slightly larger than the diameter of flange 23 of the pins 3 whereby the pins 3 which are disposed within tube members 26 and openings 6 are guided by flanges 23 and tube members 26. Springs 27 are provided in tube members 26 for urging the shear pins 3 toward the flange 12. Cap members 28 are removably affixed to the ends of the tube members 26 opposite that affixed to the flange 5 for retaining the springs 27 within the tube members 26 and compressing the springs 27 in order to urge the shear pins 3 toward the flange 12.

The cap members 28 may be affixed to the tube members 26 by any suitable means, such as threading, which permits easy removal for replacing broken shear pins 3. In order to maintain the pins 3 more firmly in the openings 6 and 13, the openings 6 in the flange 5 have counterbored recesses 29 located on the side of the flange 5 away from flange 12. The recesses 29 have a diameter slightly larger than the diameter of flange 23 of pins 3 whereby the flange 23 is disposed within the counterbored recess 29 when the pin 3 is disposed within both openings 6 and 13.

In operation when an overload in the machine is transmitted to shaft 11 the shear pin 3 disposed within openings 6 and 13 is sheared at the circumferential groove 25. With the overload the driving flange 5 will rotate relative to the driven flange 12 until the next shear pin 3 is aligned with opening 13 whereupon spring 27 forces the shear pin into the opening 13 thus replacing the broken shear pin 3. When the machine or mechanism is again overloaded, the latter shear pin 3 breaks and the next shear pin 3 in line replaces it through the action of its respective spring 27. In order to avoid the possibility of having a shear pin 3 pass over opening 13, opening 13 may be elongated thus facilitating insertion of a pin 3 in the opening 13.

It is to be understood that various changes and modifications may be made to the foregoing without departing from the spirit of the invention or the scope of the appended claims.

What is claimed is:

1. An apparatus for transmitting rotary motion comprising a first member having a center of rotation and a plurality of openings therein having wall portions equispaced from the center of rotation, a second member having a second center of rotation and an opening therein alined with an opening in the first member, the centers of rotation of the first member and the second member falling on a straight line, a first shear pin disposed within an opening in the first member and received by the alined opening in the second member for transmitting rotary motion from one member to the other around the straight line as an axis of rotation, the wall portions of the plurality of openings in the first member and the alined opening in the second member being shaped to receive and hold shear pins against substantial lateral movement relative to the members, at least one additional shear pin disposed within an opening in the first member, and means for urging the shear pins longitudinally toward the second member, whereby the additional shear pin can be brought into alinement with said opening in the second flange upon breaking of the first shear pin.

2. An apparatus for transmitting rotary motion comprising a first member having a plurality of openings therein, tube members affixed to the first member, coaxially with respect to the openings in the first member, a second member having at least one opening therein, a shear pin disposed within an opening in the first member and an opening in the second member for transmitting rotary motion from one member to the other, at least one additional shear pin disposed within a tube member and an opening in the first member, spring means disposed within the tube members for urging the shear pins toward the second member, and means for retaining the spring means in the tube members and for compressing the spring means.

3. An apparatus for transmitting rotary motion comprising a first shaft, a first flange having a plurality of openings therein affixed to the first shaft, tube members affixed to the first flange coaxially with respect to the openings in the first flange, a second shaft axially aligned with the first shaft, a second flange having an opening therein affixed to the second shaft, a shear pin disposed within an opening in the first flange and the opening in the second flange for transmitting rotary motion from one flange to the other, at least one additional shear pin disposed within a tube member and an opening in the first flange, spring means disposed within the tube members for urging the shear pins toward the second flange and means for retaining the spring means in the tube members and for compressing the spring means.

4. The apparatus of claim 3 wherein the means for retaining the spring means within the tubes and for compressing the spring means comprise cap members removably affixed to the ends of the tube members opposite the ends affixed to the first flange.

5. The apparatus of claim 4 wherein the opening in the second flange within which a shear pin is disposed is an elongated opening.

6. The apparatus of claim 5 wherein the shear pins have a flange at the ends of the pins opposite the ends the openings in the firs flange are slightly larger than the inside diameter of the tube members is slightly larger than the diameter of the flange of the shear pin.

7. The apparatus of claim 6 wherein the diameter of the openings in the first flange are slightly larger than the diameter of the shear pins and have counterbored recesses on the side of the first flange away from the second flange with a diameter slightly larger than the diameter of the shear pin flange.

References Cited in the file of this patent

UNITED STATES PATENTS

| | | |
|---|---|---|
| 373,784 | Myers | Nov. 22, 1887 |
| 1,740,617 | Morgan | Dec. 24, 1929 |
| 1,740,838 | Roesen | Dec. 24, 1929 |

UNITED STATES PATENT OFFICE

CERTIFICATE OF CORRECTION

Patent No. 3,049,898                                    August 21, 1962

Donald E. Voth

It is hereby certified that error appears in the above numbered patent requiring correction and that the said Letters Patent should read as corrected below.

Column 4, lines 39 and 40, for "the openings in the firs flange are slightly larger than" read -- disposed within the openings in the first flange and --.

Signed and sealed this 4th day of December 1962.

(SEAL)
Attest:

ERNEST W. SWIDER
Attesting Officer

DAVID L. LADD
Commissioner of Patents